United States Patent
Tang et al.

(10) Patent No.: US 12,183,938 B2
(45) Date of Patent: Dec. 31, 2024

(54) BATTERY PACK AND ELECTRIC APPARATUS

(71) Applicant: CONTEMPORARY AMPEREX TECHNOLOGY (HONG KONG) LIMITED, Hong Kong (CN)

(72) Inventors: Yu Tang, Ningde (CN); Zhimin Zeng, Ningde (CN); Haiqi Yang, Ningde (CN); Xiaoteng Huang, Ningde (CN); Peng Wang, Ningde (CN); Chenyi Xu, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 0 days.

(21) Appl. No.: 18/609,901

(22) Filed: Mar. 19, 2024

(65) Prior Publication Data
US 2024/0266658 A1  Aug. 8, 2024

Related U.S. Application Data

(63) Continuation of application No. PCT/CN2022/119655, filed on Sep. 19, 2022.

(30) Foreign Application Priority Data

Jan. 12, 2022  (CN) .......................... 202220075726.1

(51) Int. Cl.
*H01M 50/242*  (2021.01)
*H01M 50/204*  (2021.01)
*H01M 50/244*  (2021.01)

(52) U.S. Cl.
CPC ....... *H01M 50/242* (2021.01); *H01M 50/204* (2021.01); *H01M 50/244* (2021.01)

(58) Field of Classification Search
CPC . H01M 50/242; H01M 50/244; H01M 50/204
(Continued)

(56) References Cited

U.S. PATENT DOCUMENTS

| 9,461,285 B2 * | 10/2016 | Klausmann ......... H01M 10/613 |
| 2009/0092895 A1 * | 4/2009 | Yoo ......................... B29C 45/00 |
| | | 425/542 |

(Continued)

FOREIGN PATENT DOCUMENTS

| CN | 206841148 U | 1/2018 |
| CN | 207657588 U | 7/2018 |

(Continued)

OTHER PUBLICATIONS

International Search Report for PCT application No. PCT/CN2022/119655, dated Nov. 30, 2022.
(Continued)

*Primary Examiner* — James M Erwin
(74) *Attorney, Agent, or Firm* — Ladas & Parry, LLP

(57) ABSTRACT

A battery pack and an electric apparatus are disclosed. The battery pack includes a cell dummy and multiple battery cells, a housing, a mounting beam, and a support beam. The housing is provided with an accommodating cavity, and the cell dummy and the multiple battery cells are all disposed in the accommodating cavity. The mounting beam is disposed in a length direction of the accommodating cavity and defines, together with the accommodating cavity, a mounting space for accommodating the cell dummy and the multiple battery cells. The support beam is disposed in a width direction of the accommodating cavity and is mounted in a manner of fitting with the cell dummy. The cell dummy being provided with the support beam perpendicular to the
(Continued)

mounting beam can enhance structural strength of the battery pack in the width direction of the accommodating cavity.

13 Claims, 2 Drawing Sheets

(58) Field of Classification Search
USPC .......................................................... 429/186
See application file for complete search history.

(56) References Cited

U.S. PATENT DOCUMENTS

| | | | | |
|---|---|---|---|---|
| 2015/0291045 | A1* | 10/2015 | Sugawara | ............. B60L 3/0046 318/139 |
| 2015/0349389 | A1* | 12/2015 | Kobune | ................ B60L 3/0046 429/90 |
| 2020/0052353 | A1* | 2/2020 | Imade | ................ H01M 50/293 |

FOREIGN PATENT DOCUMENTS

| | | |
|---|---|---|
| CN | 211265551 U | 8/2020 |
| CN | 215451611 U | 1/2022 |
| CN | 217158406 U | 8/2022 |
| JP | 2020014870 A | 1/2020 |
| WO | 2016136248 A1 | 9/2016 |
| WO | 2021103867 A1 | 6/2021 |
| WO | 2021210806 A1 | 10/2021 |
| WO | 2023004831 A1 | 2/2023 |

OTHER PUBLICATIONS

Written Opinion of International Searching Authority for PCT application No. PCT/CN2022/119655, dated Nov. 30, 2022.
Office action from corresponding Japanese Patent Application No. 2024-516839 dated Oct. 28, 2024, with its English translation.

* cited by examiner

BATTERY PACK AND ELECTRIC APPARATUS

CROSS-REFERENCE TO RELATED APPLICATIONS

This application is a continuation of International Patent Application No. PCT/CN2022/119655, filed on Sep. 19, 2022, which claims priority to Chinese patent application No. 202220075726.1, filed on Jan. 12, 2022. The aforementioned patent applications are incorporated herein by reference in their entirety.

TECHNICAL FIELD

Embodiments of this application relate to the field of battery technologies, and in particular, to a battery pack and an electric apparatus.

BACKGROUND

At present, countries all over the world are actively developing electric vehicles. Battery packs of electric vehicles are one of the three core technologies of electric vehicles, and the safety and stability thereof directly affect the overall performance and driving safety of electric vehicles.

However, internal beams in existing traction battery packs are arranged in only one direction, and generally longitudinal beams are used. In a flat battery pack structure, a water cooling plate structure is provided in a horizontal position of the middle of the battery pack. Due to influences of the process assembly requirements and structural requirements of a flat battery pack, an internal beam in a direction perpendicular to an original beam cannot be arranged in a housing, which results in a relatively low strength in this direction, leading to a worse situation especially when collision or extrusion occurs in this direction.

SUMMARY

In view of the foregoing problems, embodiments of this application provide a battery pack and an electric apparatus, so as to enhance strength of the battery pack and improve stability and service life of the battery pack.

According to a first aspect, an embodiment of this application provides a battery pack including a cell dummy and multiple battery cells. The battery pack further includes a housing, a mounting beam, and a support beam. The housing is provided with an accommodating cavity, and the cell dummy and the multiple battery cells are all disposed in the accommodating cavity. The mounting beam is disposed in a length direction of the accommodating cavity and defines, together with the accommodating cavity, a mounting space for accommodating the cell dummy and the multiple battery cells. The support beam is disposed in a width direction of the accommodating cavity and is mounted in a manner of fitting with the cell dummy.

In the technical solution of this embodiment of this application, the cell dummy being provided with the support beam perpendicular to the mounting beam can enhance structural strength of the battery pack in the width direction of the accommodating cavity, enhance strength of the battery pack for resisting extrusion and collision in this direction, and improve safety of the battery pack.

In some embodiments, the support beam extends out of the cell dummy to fit with the mounting beam so as to jointly maintain the structural strength of the battery pack in the length direction and width direction of the accommodating cavity.

In some embodiments, a mounting hole runs through the cell dummy, and the support beam is disposed in the mounting hole and extends out of two ends of the mounting hole. The provision of the mounting hole facilitates assembly of the support beam.

In some embodiments, the support beam and the mounting beam are integrally formed, and the support beam is disposed in the mounting hole. The support beam and the mounting beam have a higher integration level.

In some embodiments, the support beam and the cell dummy are integrally formed, to avoid influences of assembly errors of the support beam and the cell dummy on the strength of the battery pack in the width direction of the accommodating cavity.

In some embodiments, the support beam abuts against the mounting beam, thereby enhancing stiffness of the battery pack and also protecting a pole of the battery cell.

In some embodiments, a gap is present between the support beam and the mounting beam, facilitating mounting of the support beam and/or the cell dummy.

In some embodiments, the gap is filled with a structural adhesive, such that the gap is filled up to enhance the strength of the battery pack.

In some embodiments, in the length direction of the accommodating cavity, two sides of the cell dummy are each provided with the battery cell to ensure that the cell dummy is disposed in the middle of the accommodating cavity in the length direction, thus improving the stability of the battery pack.

In some embodiments, the cell dummy is disposed close to the bottom of the accommodating cavity so as to avoid addition of unnecessary joints that increase the process difficulty.

According to a second aspect, an embodiment of this application further provides an electric apparatus including the foregoing battery pack, where the battery pack is configured to provide electrical energy.

The foregoing description is merely an overview of the technical solutions of this application. For a better understanding of the technical means in this application such that they can be implemented according to the content of the specification, and to make the above and other objectives, features and advantages of this application more obvious and easier to understand, the following describes specific embodiments of this application.

BRIEF DESCRIPTION OF DRAWINGS

To describe the technical solutions in the embodiments of this application more clearly, the following briefly describes the accompanying drawings for describing the embodiments of this application. Apparently, the accompanying drawings in the following description show merely some embodiments of this application, and persons of ordinary skill in the art may still derive other drawings from these accompanying drawings without creative efforts.

Figure 1:
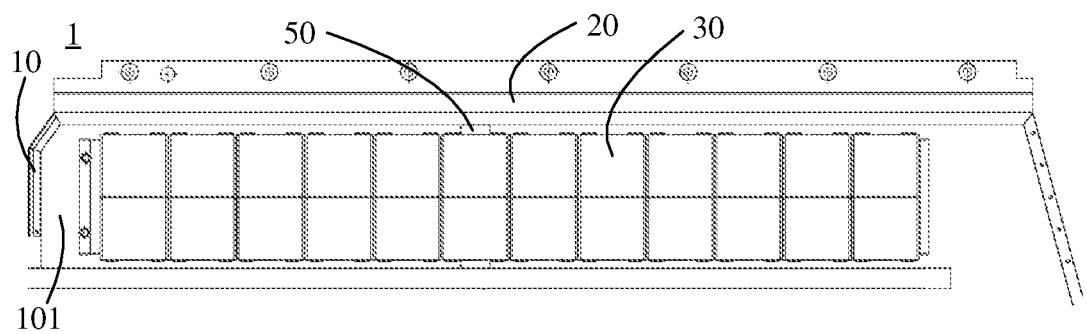
FIG. 1 is a schematic structural diagram of a battery pack according to an embodiment of this application.

Reference signs in specific embodiments are as follows:
battery pack 1;
housing 10;
accommodating cavity 101;
mounting beam 20;
battery cell 30;
cell dummy 40; and
support beam 50.

DETAILED DESCRIPTION

For ease of understanding this application, the following further describes this application in detail with reference to the accompanying drawings and specific embodiments. It should be noted that when a component is referred to as being "disposed in" or "fixed to" or "connected to" another component, it may be directly on the another component, or there may be one or more components in between. When a component is referred to as being "connected to" another component, it may be directly connected to the another component, or there may be one or more components in between. The orientations or positional relationships indicated by the terms "bottom", "head end", "tail end", and the like used in this specification are based on the orientations or positional relationships shown in the accompanying drawings. Such terms are intended merely for the ease and brevity of description of this application rather than indicating or implying that the apparatuses or components mentioned must have specified orientations or must be constructed and manipulated in the specified orientations, and therefore shall not be construed as any limitation on this application. In addition, the terms "first", "second" and the like are merely intended for a purpose of description, and shall not be understood as an indication or implication of relative importance.

In the description of the embodiments of this application, "multiple" means more than two (inclusive).

Unless otherwise defined, all technical and scientific terms used in this specification shall have the same meanings as commonly understood by those skilled in the art to which this application belongs. The terms used in the specification of this application are merely intended to describe specific embodiments rather than to limit this application.

In addition, technical features involved in different embodiments of this application that are described below may be combined as long as they do not conflict with each other.

In addition, technical features involved in different embodiments of this application that are described below may be combined as long as they do not conflict with each other.

Currently, from a perspective of market development, application of traction battery packs is becoming more and more extensive. Traction battery packs have been widely used in not only energy storage power supply systems such as hydroelectric, thermal, wind, and solar power plants, but also other fields including electric transportation tools such as electric bicycles, electric motorcycles and electric vehicles, military equipment, and aerospace. With continuous expansion of application fields of traction battery packs, market demands for the traction battery packs are also expanding.

The battery pack disclosed in the embodiments of this application may be used in but not limited to electric apparatuses such as vehicles, ships, or aircrafts. The battery pack disclosed in this application may be used to constitute a power supply system of the electric apparatus. This helps to alleviate the problem that the service life of the battery pack is affected by insufficient strength of the battery pack.

FIG. 1 is a schematic structural diagram of a battery pack 1 according to an embodiment of this application. The battery pack 1 includes a housing 10, a mounting beam 20, multiple battery cells 30, a cell dummy 40, and a support beam 50. The housing 10 is provided with an accommodating cavity 101, and the cell dummy 40 and the multiple battery cells 30 are all disposed in the accommodating cavity 101. The mounting beam 20 is disposed in a length direction of the accommodating cavity 101 and defines, together with the accommodating cavity 101, a mounting space for accommodating the cell dummy 40 and the multiple battery cells 30. The support beam 50 is disposed in a width direction of the accommodating cavity 101 and is mounted in a manner of fitting with the cell dummy 40.

The cell dummy being provided with the support beam perpendicular to the mounting beam can enhance structural strength of the battery pack in the width direction of the accommodating cavity, thus enhancing strength of the battery pack for resisting extrusion and collision in this direction and improving safety of the battery pack.

Figure 2:
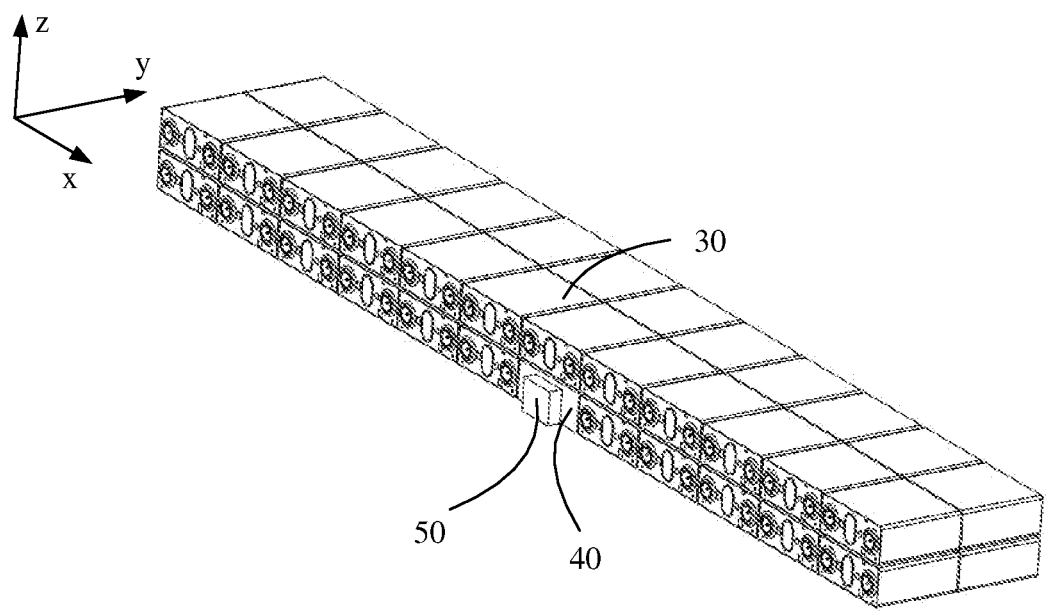
FIG. 2 is a schematic diagram of mounting of a cell dummy and a support beam in the battery pack shown in FIG. 1.

Referring to FIG. 2, for ease of description, the length direction of the accommodating cavity is defined as direction x, the width direction of the accommodating cavity is defined as direction y, and a direction perpendicular to both direction x and direction y is direction z.

In some embodiments, the support beam 50 extends out of the cell dummy 40 to fit with the mounting beam 20 so as to jointly maintain the structural strength of the battery pack 1 in direction x and direction y.

In some embodiments, the support beam 50 is independent of the cell dummy 40. For example, a mounting hole (not shown in the figure) runs through the cell dummy 40 along direction y, and the support beam 50 is disposed in the mounting hole and extends out of two ends of the mounting hole. The provision of the mounting hole facilitates assembly of the support beam 50.

It can be understood that the support beam may be in a clearance fit or an interference fit with the mounting hole. This is not limited in this application. Under the condition that the support beam is in a clearance fit with the mounting hole, to prevent the support beam from shaking in the mounting hole, an additional locking apparatus may be used to lock the support beam and the cell dummy. Alternatively, the support beam is fixedly mounted in the mounting hole. For example, the fixed mounting is welding.

In some embodiments, the support beam 50 and the mounting beam 20 are integrally formed, and the support beam 50 is disposed in the mounting hole. The support beam 50 and the mounting beam 20 have a higher integration level.

In some embodiments, the support beam 50 and the cell dummy 40 are integrally formed, to avoid influence of assembly errors of the support beam 50 and the cell dummy 40 on the structural strength of the battery pack in direction y.

Figure 3:
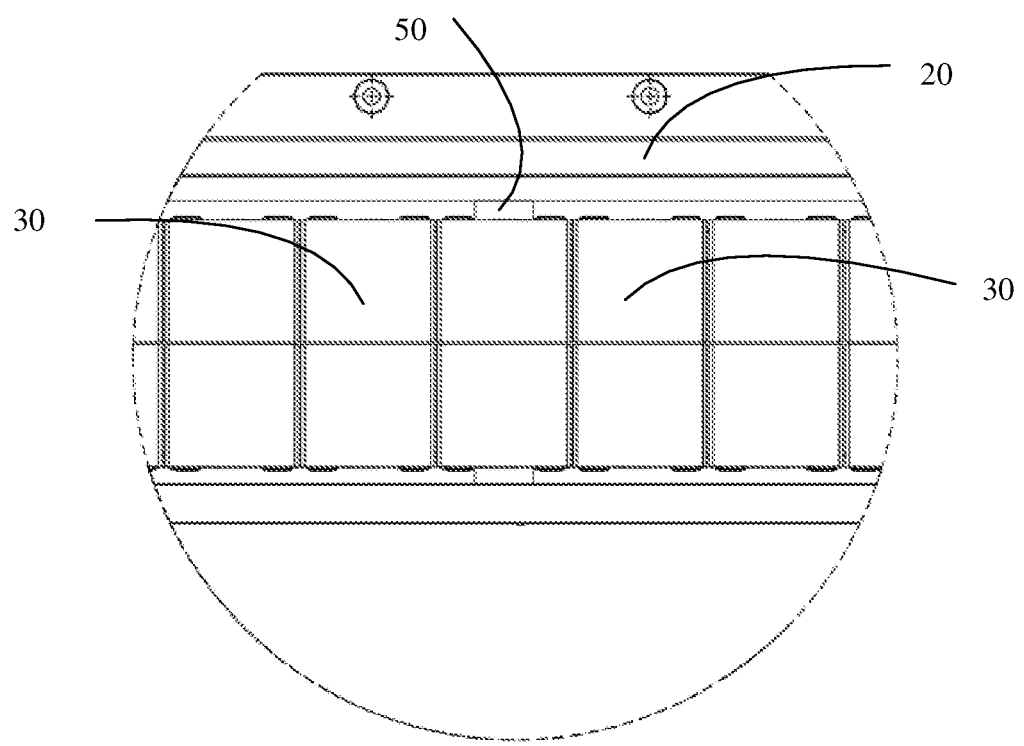
FIG. 3 is an enlarged schematic diagram of a position where the cell dummy in the battery pack shown in FIG. 1 is located.

In some embodiments, referring to FIG. 3, the support beam 50 abuts against the mounting beam 20, thereby enhancing stiffness of the battery pack in direction y.

In some embodiments, under the condition that the support beam 50 and the cell dummy 40 are integrally formed, to facilitate arrangement of the support beam 50 and/or the cell dummy 40 in the mounting space, a gap is present between the support beam 50 and the mounting beam 20. To guarantee the stiffness of the battery pack in direction y, the gap is filled with a structural adhesive.

In some embodiments, the cell dummy 40 and the multiple battery cells 30 are stacked in the mounting space. For example, the cell dummy 40 and the multiple battery cells 30 are stacked along direction x, or the cell dummy 40 and the multiple battery cells 30 are stacked along direction y, or the cell dummy 40 and the multiple battery cells 30 are stacked along direction z.

In these embodiments of this application, as shown in FIG. 2, the cell dummy 40 and the multiple battery cells 30 are stacked along direction x, and the cell dummy 40 and the multiple battery cells 30 are stacked along direction z.

It can be understood that for ease of mounting, the cell dummy and the battery cell are the same in size.

In addition, the cell dummy has higher structural strength than the battery cell, and the provision of the cell dummy can effectively enhance the structural strength of the battery pack.

It should be noted that the multiple battery cells each have a pole extending toward a same side. In these embodiments of this application, the pole extends out along direction y.

In some embodiments, a portion of the support beam 50 extending out of the cell dummy 40 is higher than a portion of the pole extending out of the battery cell 30, such that the support beam 50 can protect the pole of the battery cell, thereby preventing damage of the pole caused by collision.

In some embodiments, to improve the stability of the battery pack 1, in direction x, two sides of the cell dummy 40 are each provided with the battery cell 30, so as to ensure that the support beam 50 is located in the middle of the mounting space.

It should be noted that the above-mentioned middle refers to, in direction x, a position other than a head end and a tail end of stacked battery cells where the cell dummy is located. In other words, in direction x, the cell dummy is located between the head end and the tail end of the stacked battery cells.

In some embodiments, the cell dummy 40 is disposed close to the bottom of the accommodating cavity 101. Specifically, in direction z, the cell dummy is located at the head end of the stacked battery cell to avoid addition of an unnecessary water cooling joint structure that wastes the mounting space and increases the weight of the battery pack. Specifically, in a flat battery pack, in direction z, a middle position of the accommodating cavity is typically provided with a water cooling joint. If the cell dummy is located in the middle or a position above the middle of the accommodating cavity in direction z, the support beam and/or cell dummy inevitably interfere with the water cooling joint. Therefore, to ensure that cooling water can enter a cooling channel of a water cooling plate, an additional water cooling joint is bound to be provided.

An embodiment of this application further provides an electric apparatus including the foregoing battery pack 1, where the battery pack 1 is configured to provide electrical energy.

The electric apparatus may be but is not limited to a mobile phone, a tablet computer, a laptop computer, an electric toy, an electric tool, an electric bicycle, an electric vehicle, a ship, and a spacecraft. The electric toy may be a fixed or mobile electric toy, for example, a game console, an electric toy car, an electric toy ship, and an electric toy airplane. The spacecraft may include an airplane, a rocket, a space shuttle, a spaceship, and the like.

As compared with the prior art, according to the battery pack and the electric apparatus provided in the embodiments of this application, the cell dummy being provided with the support beam perpendicular to the mounting beam can enhance the structural strength of the battery pack in the width direction of the accommodating cavity, thus enhancing the strength of the battery pack for resisting extrusion and collision in this direction and improving the safety of the battery pack.

Finally, it should be noted that the foregoing embodiments are merely intended to describe the technical solutions of this application rather than to limit this application. Under the idea of this application, the foregoing embodiments or the technical features in different embodiments can also be combined, the steps can be implemented in any order, and there are many other changes in different aspects of this application as described above, which, for the sake of brevity, are not provided in detail. Although this application is described in detail with reference to the foregoing embodiments, persons of ordinary skill in the art should understand that modifications can be made to the technical solutions described in the foregoing embodiments, or equivalent substitutions can be made to some technical features therein, and these modifications or substitutions do not make the essence of the corresponding technical solutions depart from the scope of the technical solutions of the embodiments of this application.

What is claimed is:

1. A battery pack, comprising:
   a cell dummy and a plurality of battery cells;
   a housing provided with an accommodating cavity, wherein the cell dummy and the plurality of battery cells are configured to be disposed in the accommodating cavity;
   a mounting beam, disposed in one direction of the accommodating cavity and defining, together with the accommodating cavity, a mounting space for accommodating the cell dummy and the plurality of battery cells; and
   a support beam, disposed in the other direction of the accommodating cavity and configured to fit within the cell dummy.

2. The battery pack according to claim 1, wherein the support beam is configured to extend extends-out of the cell dummy.

3. The battery pack according to claim 2, wherein the support beam is disposed independently of the cell dummy.

4. The battery pack according to claim 2, wherein a mounting hole is configured to run through the cell dummy, and the support beam is disposed in the mounting hole and configured to extend out of two ends of the mounting hole.

5. The battery pack according to claim 4, wherein the plurality of battery cells each comprises a pole extending toward the other direction of the accommodating cavity, and a portion of the support beam extending out of the cell dummy is higher than a portion of the pole extending out of the battery cell.

6. The battery pack according to claim 3, wherein the support beam and the mounting beam are integrally formed, and the support beam is disposed in a mounting hole of the cell dummy.

7. The battery pack according to claim 2, wherein the support beam and the cell dummy are integrally formed.

8. The battery pack according to claim 2, wherein the support beam is configured to abut against the mounting beam.

9. The battery pack according to claim 2, wherein a gap is present between the support beam and the mounting beam.

10. The battery pack according to claim 1, wherein the cell dummy and the plurality of battery cells are stacked in the mounting space.

11. The battery pack according to claim 1, wherein in the one direction of the accommodating cavity, two sides of the cell dummy are each provided with one battery cell.

12. The battery pack according to claim 11, wherein in the other direction of the accommodating cavity, the cell dummy is disposed adjacent to a bottom of the accommodating cavity.

13. An electric apparatus, comprising the battery pack according to claim 1, wherein the battery pack is configured to provide electrical energy.

* * * * *